United States Patent
Zwartenkot et al.

(10) Patent No.: US 6,559,896 B1
(45) Date of Patent: May 6, 2003

(54) PLURAL IMAGE DISPLAY

(75) Inventors: Hendrik T. J. Zwartenkot, Nijmegen (NL); Jacob J. Veerhoek, Los Gatos, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/348,919

(22) Filed: Jul. 6, 1999

(30) Foreign Application Priority Data

Jul. 6, 1998 (EP) .......................................... 98202271

(51) Int. Cl.$^7$ ................................................ H04N 9/64
(52) U.S. Cl. ...................... 348/714; 348/567; 348/715; 348/716; 348/718
(58) Field of Search ................................ 348/565, 567, 348/714, 715, 716, 717, 718, 459; 345/531, 534, 541, 864, 872

(56) References Cited

U.S. PATENT DOCUMENTS

| | | | | |
|---|---|---|---|---|
| 4,069,499 A | * | 1/1978 | Ninomiya .................... | 348/498 |
| 4,249,213 A | * | 2/1981 | Imaide et al. ............... | 348/565 |
| 4,665,438 A | * | 5/1987 | Miron et al. ................. | 348/566 |
| 4,745,479 A | * | 5/1988 | Waehner ...................... | 348/567 |
| 4,982,279 A | * | 1/1991 | Ishii et al. ................... | 348/553 |
| 4,987,491 A | * | 1/1991 | Kaite et al. ................. | 348/497 |
| 5,016,106 A | * | 5/1991 | Yong-Je et al. ............. | 348/565 |
| 5,021,887 A | * | 6/1991 | Park .......................... | 348/559 |
| 5,369,442 A |   | 11/1994 | Braun ......................... | 348/567 |
| 5,528,380 A | * | 6/1996 | Sato et al. .................. | 348/455 |
| 5,801,788 A | * | 9/1998 | Ashida et al. .............. | 348/565 |

(List continued on next page.)

FOREIGN PATENT DOCUMENTS

| | | | |
|---|---|---|---|
| EP | 0229431 B1 | 12/1986 | ............ H04N/5/45 |
| EP | 0249281 B1 | 6/1987 | ............ H04N/5/45 |
| EP | 0304236 B1 | 2/1989 | ............ H04N/5/45 |
| EP | 0471878 B1 | 2/1992 | ............ H04N/5/45 |
| WO | WO9733428 | 9/1997 | ............ H04N/5/45 |
| WO | WO9733429 | 9/1997 | ............ H04N/5/45 |

OTHER PUBLICATIONS

"Fully Digitalized Color Picture in Picture Television System" by Michio Masuda et al., in IEEE Transactions on Consumer Electronics, vol. CE–35, Feb. 1979, pp. 152–158.

"Picture in Picture System with a Digital Memory for VCRS" by Michio Mashuda et al., in IEEE Transactions on Consumer Electronics, vol. CE–33, No. 3, Aug. 1987, pp. 230–238.

*Primary Examiner*—John Miller
*Assistant Examiner*—Linus H Lo
(74) *Attorney, Agent, or Firm*—Edward W. Goodman

(57) ABSTRACT

In a method of controlling a memory (5) to allow for a display of at least two images, write and read speeds of writing image data into and reading image data from the memory (5) are measured (9–15) to predict a crossing where a write action overtakes a read action or reversely, where a new field of said image data is written (13, 3) into the memory (5) from a same initial position as from which a previous field of the image data was written into the memory (5) if no crossing is predicted, and the new field of said image data is written (13, 3) into the memory (5) from an end position in the memory (5) at which an end of the previous field of the image data was written into the memory (5) if a crossing is indeed predicted, the memory (5) having a size being larger than that needed for one field but less than that needed for two fields of the image data at its largest read-out size.

3 Claims, 2 Drawing Sheets

U.S. PATENT DOCUMENTS

| | | | |
|---|---|---|---|
| 5,812,212 A | * 9/1998 | Hamamatsu et al. | 348/512 |
| 5,818,468 A | * 10/1998 | Le Cornec et al. | 345/501 |
| 5,883,676 A | * 3/1999 | Miyazaki et al. | 348/564 |
| 5,940,146 A | * 8/1999 | Sakaguchi et al. | 348/561 |
| 5,990,975 A | * 11/1999 | Nan et al. | 348/525 |
| 6,069,662 A | * 5/2000 | Horiuchi et al. | 348/446 |
| 6,141,055 A | * 10/2000 | Li | 348/446 |
| 6,188,440 B1 | * 2/2001 | Toujima et al. | 348/14.12 |
| 6,295,094 B1 | * 9/2001 | Cuccia | 348/559 |
| 6,356,317 B1 | * 3/2002 | Watabe et al. | 348/395.1 |

* cited by examiner

PLURAL IMAGE DISPLAY

BACKGROUND OF THE INVENTION

1. Field of the Invention

The invention relates to plural image display, such as picture-in-picture (PIP) or double-window displays.

2. Description of the Related Art

U.S. Pat. No. 5,369,442 discloses a method for picture-in-picture insertion, and a device for performing the method, in which successive frames of a small picture to be inserted into a main picture having successive frames are alternatingly written frame-wise into a memory region of a memory device. A decision signal is generated at a beginning of a display of the main picture, for deciding from which of the two memory regions a stored frame of the small picture is to be read out. Frames of the small picture are read out from whichever memory region enables joint-line-free insertion of the small picture into the main picture.

In PIP or double-window applications, one live video signal is inserted in another live video signal. Generally, the two video signals are independent of each other and therefore can differ in frequency (field repetition rate). This means that one of the signals has to be synchronized to the other (on field base). The minimum amount of memory for the synchronizing circuit is one field. However, if only one field can be stored in memory, an artifact in the resulting video signal will occur, which is referred to as 'joint line error'. A joint line error occurs if an outgoing field is built up of two subsequent input fields and is caused the read and write pointers of the field memory crossing each other. The standard approach in PIP applications to prevent a joint line error is to store two subsequent fields in memory and choosing to read the field which is not currently been written. In this way, the write pointer never crosses the read pointer and no joint line error will occur. The drawback is that it requires twice the amount of memory.

SUMMARY OF THE INVENTION

It is, inter alia, an object of the invention to use less memory in coping with the joint line error problem. To this end, a first aspect of the invention provides a memory control method and device. A second aspect of the invention provides a display apparatus for displaying at least two images.

In a method of controlling a memory to allow for a display of at least two images in accordance with a primary aspect of the present invention, write and read speeds of writing image data into and reading image data from the memory are measured to predict a crossing where a write action overtakes a read action, or reversely, where a new field of said image data is written into the memory from a same initial position as from which a previous field of the image data was written into the memory if no crossing is predicted, and the new field of said image data is written from an end position in the memory at which an end of the previous field of the image data was written into the memory if a crossing is indeed predicted, the memory having a size being larger than that needed for one field but less than that needed for two fields of the image data at its largest read-out size. If the method is only used for PIP, the read-out size is the size of a PIP image, while if the method is used for (both PIP and) double-window display, the largest read-out size is that of the left-hand or right-hand half of the double-window display.

These and other aspects of the invention will be apparent from and elucidated with reference to the embodiments described hereinafter.

DESCRIPTION OF THE PREFERRED EMBODIMENTS

Figure 1A:
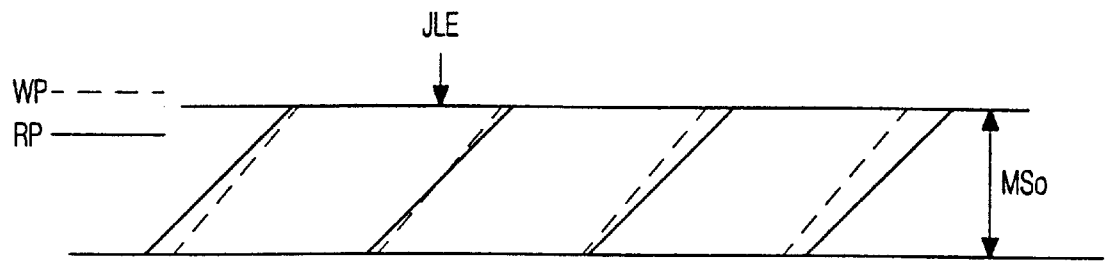
FIG. 1A shows the joint line or cross-over artifact.
Figure 1B:
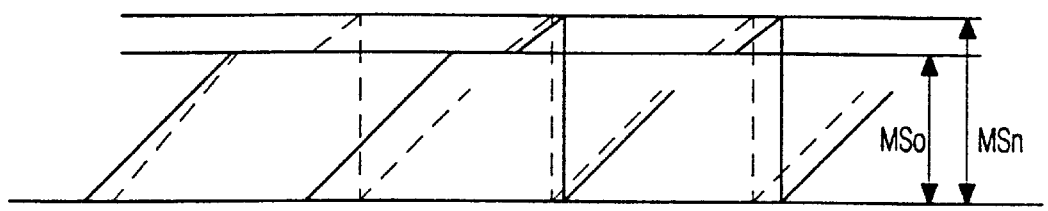
FIG. 1B illustrates how the joint line artifact is solved in accordance with the present invention.

In accordance with an aspect of the present invention, in an application for (both PIP and) double window display, slightly more (e.g., 8%) than just one field memory is used, as well as some control logic to prevent the read pointer from crossing the write pointer. The principle is that crossings are predicted and precautions are taken to prevent them. This is depicted in FIGS. 1A, 1B. The above-mentioned amount of about 8% is derived in the following manner. In a double window application, each of the channels may have a deviation of plus or minus 2% in the input line frequency, so that the maximum deviation between the two channels is 4%. The 2% is derived from the specifications of a typical video recorder. Further, the control logic described below may result in false detections of a crossing where there is none. To cope with such false detections, some additional margin in the field memory a size is required. If, for this additional margin,another 4% is taken into account, the total size of the required memory becomes 8% more than a standard field memory. This derivation of the additional size required shows that the actual size chosen heavily depends on the properties of the chosen implementation.

In an embodiment, the amount ReqAdMem of additionally required memory can be expressed as follows:

$$ReqAdMem = MemF * \left\{ \frac{\max(|fHadd - fHmain|)}{\min(fHadd, fHmain)} + k \right\}$$

if the invention is applied in a television set which has (both the PIP feature and) the double window feature, so that the double window feature determines the amount of additionally required memory, and $$ReqAdMem = MemPIP * \left\{ \frac{\max(|fHadd - fHmain|)}{\min(fHadd, fHmain)} + (1 - cf) + k \right\}$$

if the invention is applied in a television set which has the PIP feature but not the double window feature,
in which
- MemF is the size of the memory necessary to store one field of the left-hand or right-hand half of the double window,
- MemPIP is the size of the memory required to store a PIP-field,
- fHadd is the line frequency of the additional channel,
- fHmain is the line frequency of the main channel,
- the max-function is there to take fluctuations into account,
- cf is the vertical compression factor applied to PIP images, and
- k is the extra amount of memory required to take false crossing detections into account.

From the second formula, it becomes clear that in PIP applications in which the vertical compression factor cf=⅓, slightly more than about 1+⅔ PIP-size field memories are required, which is less than 2 PIP-size field memories as required in the prior art.

FIG. 1A shows the joint line or cross-over artifact. The interrupted lines indicate the memory write pointer WP, while the uninterrupted lines indicate the memory read pointer RP. The arrow JLE indicates the crossing joint line error, where the write pointer WP crosses the read pointer RP. The memory has an original memory size MSo.

In accordance with another aspect of the present invention, the write and read speeds are measured for predicting a crossing. The write speed is related to the frequency of the horizontal synchronization frequency $Hsync_{acq}$ of the incoming video signal, and the read speed is related to the horizontal synchronization frequency $Hsync_{dis}$ of the other incoming video signal which is locked to the outgoing video signal. During the time of writing one field, a counter counts upwards on pulses $Hsync_{acq}$ of the first signal and downwards on pulses $Hsync_{dis}$ of the other signal. At the end of writing, the counter contains the difference in write and read speed expressed in number of lines per field. With this value and the location of the read pointer RP, it can be predicted just before the start of writing a new field whether a crossing will or will not occur. If a crossing is predicted, the new field will be written just after the last line of the previous written field, and if not, the new field will be written at the same place where the last field was written. This means that if a crossing is predicted, a slightly larger memory (new memory size MSn) is required than in the other case (old memory size MSo). This is illustrated in FIG. 1B. An embodiment of a memory control device for putting this into effect is shown in FIG. 2.

Figure 2:
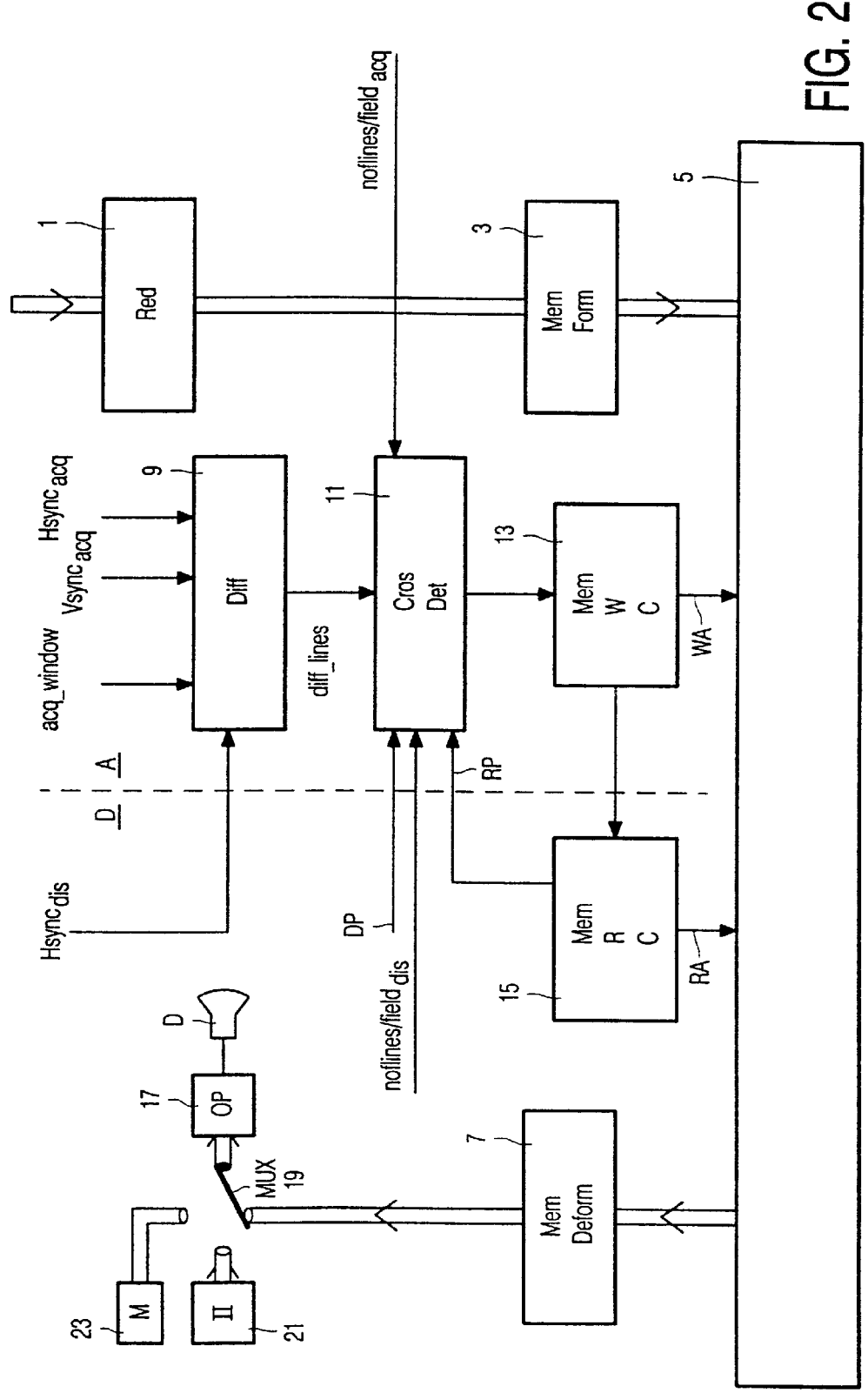
FIG. 2 shows an embodiment of a memory control in accordance with the present invention.

In the data path of the device of FIG. 2, at an acquisition side A of the device, input pixel data is delivered to the reduction block (RED) 1. In a double window application, this block 1 is a horizontal reduction block which compresses the data until half the horizontal size (other factors are also possible). After this reduction, the pixel data is formatted by a memory formatter (MEM Form) 3 into a format such that it can be written into a field memory 5. At a display side D of the field memory 5, the pixel data is read from the field memory 5 and deformatted by a memory deformatter (Mem Deform) 7 in such a manner that it can be outputted to an output processor OP of the device.

In the control path of the device of FIG. 2, pixel data at acquisition side A is accompanied by H and V synchronization signals $Hsync_{acq}$ and $Vsync_{acq}$. The signal acq_window indicates the vertical acquisition window of a field. The block (Diff) 9 determines the difference in frequencies between the acquisition and display channel. This is done by incrementing a counter on acquisition pulses $Hsync_{acq}$ and decrementing the same counter on display pulses $Hsync_{dis}$. The counter is running only when acq_window is high. On a falling edge of acq_window, the counter outputs its value which is diff_lines. The crossing detector block (Cros Det) 11 predicts if the memory write pointer will cross the memory read pointer in the next field. This prediction is performed at the start of each acquisition field. For the prediction, the crossing detector 9 requires the input signals diff lines, the display position DP, the memory read pointer RP, the number of lines per acquisition field noflines/field$_{acq}$ and the number of lines per display field noflines/field$_{dis}$ (which do not necessarily have to be identical). The memory write controller (MemWC) 13 generates the write start addresses WA for the video fields. The write start address WA is initialized at zero. If no crossing is predicted, the start address is the same as the start address of the previous written field. If a crossing is predicted, the start address WA is the address of the last written pixel, incremented by one. The memory write controller 13 takes care for the transfer of the start address to the read controller (MemRC) 15. The time of the transfer of this address is very critical. The memory read controller 15 generates the read address RA for the display processor. The address is copied from the write controller 13. Furthermore, the read controller 15 provides the read pointer RP which is necessary for prediction of the crossing.

The output of the memory deformatter 7 is coupled to the output processor (OP) 17 thru a multiplexer (MUX) 19. The output processor 17 includes a display driver. In the case of a double window display, the multiplexer 19 switches between the output of the memory deformatter 7 (which supplies a first half of the double window display) and the output of a second channel (II) 21 (which provides the other half of the double window display). To this end, the second channel 21 could comprise elements similar to those shown in FIG. 2. However, as for double window display, only a horizontal reduction is required, the second channel preferably only comprises a horizontal compression circuit (similar to the horizontal reduction block 1) including a line memory. In case of a PIP display, the multiplexer 19 switches between the output of the memory deformatter 7 and an output of a main channel (M) 23. If neither PIP nor double window is active, the output of the main channel 23 is connected to the output processor 17, preferably directly to the display driver part of the output processor 17. A display D is coupled to an output of the output processor 17.

It should be noted that the above-mentioned embodiments illustrate rather than limit the invention, and that those skilled in the art will be able to design many alternative embodiments without departing from the scope of the appended claims. The invention can also be used if the main channel and the additional channel have mutually different field frequencies, e.g.,one being 59.94 Hz and the other being 50 Hz. The word "comprising" does not exclude the presence of other elements or steps than those listed in a claim. The invention can be implemented by means of hardware comprising several distinct elements and by means of a suitably programed computer. In the device claim enumerating several means, several of these means can be embodied by one and the same item of hardware.

What is claimed is:

1. A method of controlling a memory comprising the steps:

measuring write and read speeds of writing image data into and reading image data from the memory;

predicting, prior to writing a new field of image data, whether a crossing, where either a write action overtakes a read action or a read action overtakes a write action, will occur during the writing of the new field of image data, said predicting step using said measured write and read speeds;

writing the new field of image data into the memory starting from an initial position in the memory corresponding to an initial position from which a previous field of image data was written into the memory if no crossing is predicted; and writing the new field of image data into the memory starting from an initial position following an end position of the previous field of image data which was written into the memory if a crossing is predicted, wherein the memory has a size which is larger than a size needed for one field but less than a size needed for two fields of the image data at a largest read-out size.

2. A memory control device comprising:

means for measuring write and read speeds of writing image data into and reading image data from the memory;

means for predicting, prior to writing each new field of image data, whether a crossing, where either a write action overtakes a read action or a read action overtakes a write action, will occur during the writing of the new field of image data, said predicting means using said measured write and read speeds;

means for writing the new field of image data into the memory starting from an initial position in the memory corresponding to an initial position from which a previous field of image data was written into the memory if no crossing is predicted; and means for writing the new field of image data into the memory starting from an initial position following an end position of the previous field of image data written into the memory if a crossing is indeed predicted, wherein the memory has a size which is larger than a size needed for one field but less than a size needed for two fields of the image data at a largest read-out size.

3. A display apparatus for displaying at least two images, the display apparatus comprising:

a memory control device as claimed in claim 2;

means for multiplexing between an output of the memory control device and an output of another channel; and a display coupled to an output of the multiplexing means.

* * * * *